(12) United States Patent
Frank et al.

(10) Patent No.: US 8,250,182 B2
(45) Date of Patent: Aug. 21, 2012

(54) DYNAMIC LOADING BETWEEN A SERVER AND A CLIENT

(75) Inventors: Shahar Frank, Ramat Hasharon (IL); Roni Luxenberg, Ra'anana (IL)

(73) Assignee: Red Hat Israel, Ltd., Raanana (IL)

(*) Notice: Subject to any disclaimer, the term of this patent is extended or adjusted under 35 U.S.C. 154(b) by 255 days.

(21) Appl. No.: 12/325,231

(22) Filed: Nov. 30, 2008

(65) Prior Publication Data

US 2010/0138475 A1  Jun. 3, 2010

(51) Int. Cl.
G06F 15/16 (2006.01)
(52) U.S. Cl. ........ 709/219; 709/203; 709/221; 709/224; 709/226
(58) Field of Classification Search .......... 709/219, 709/203, 224, 226, 221
See application file for complete search history.

(56) References Cited

U.S. PATENT DOCUMENTS

| | | | |
|---|---|---|---|
| 6,385,636 B1* | 5/2002 | Suzuki | 718/105 |
| 7,111,019 B1* | 9/2006 | Nishizawa et al. | 1/1 |
| 2001/0029523 A1* | 10/2001 | Mcternan et al. | 709/205 |
| 2003/0126200 A1* | 7/2003 | Wolff | 709/203 |
| 2004/0054763 A1* | 3/2004 | Teh et al. | 709/221 |
| 2005/0027862 A1* | 2/2005 | Nguyen et al. | 709/225 |
| 2005/0203962 A1* | 9/2005 | Zhou et al. | 707/200 |
| 2007/0061441 A1* | 3/2007 | Landis et al. | 709/224 |
| 2007/0198656 A1* | 8/2007 | Mazzaferri et al. | 709/218 |
| 2008/0127348 A1* | 5/2008 | Largman et al. | 726/24 |
| 2009/0006541 A1* | 1/2009 | Baba et al. | 709/203 |
| 2010/0138475 A1* | 6/2010 | Frank et al. | 709/203 |

OTHER PUBLICATIONS

Qumranet, Solid ICE™, Connection Broker, Apr. 2008, 7 pages.
Qumranet, Solid ICE™, Provisioning Manager, Apr. 2008, 5 pages.
Qumranet, Solid ICE™, Virtual Desktop Server (VDS), Apr. 2008, 6 pages.
Qumranet, Inc., "Solid ICE™ Overview", copyright 2008 Qumranet, Inc., Apr. 2008, pp. 1-15.
Qumranet, Inc., "KVM-Kernel-based Virtualiztion [sic] Machine", White paper, copyright 2006 Qumranet, Inc., pp. 1-5.

* cited by examiner

*Primary Examiner* — Moustafa M Meky
*Assistant Examiner* — Michael C Lai
(74) *Attorney, Agent, or Firm* — Lowenstein Sandler PC

(57) ABSTRACT

The load of a server and its client is balanced during connection setup time and dynamically during operation. In one embodiment, a server that hosts virtual machines for a plurality of clients balances its load with its clients. The server receives a request from a requesting client to establish a connection. The request includes capacity information about the requesting client. The server then negotiates with the requesting client about load allocation based on the capacity information. The negotiated load can be dynamically rebalanced after the connection is established.

20 Claims, 5 Drawing Sheets

DYNAMIC LOADING BETWEEN A SERVER AND A CLIENT

TECHNICAL FIELD

Embodiments of the present invention relate to a client-server system, and more specifically, to a virtual machine system in which a server runs virtual machines for its clients.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the computer.

Virtual machines can be provided by a centralized host that is coupled to multiple clients over a network. Some of the clients can be thin clients that have limited memory and processing capacities, and some of the clients can be thick (fat) clients that have high-speed central processing units (CPUs), large memory and graphics processors. Conventional techniques treat these clients equally and allocate the same load to all of the clients. Thus, a system that includes a mix of client types can have available resources under-utilized.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
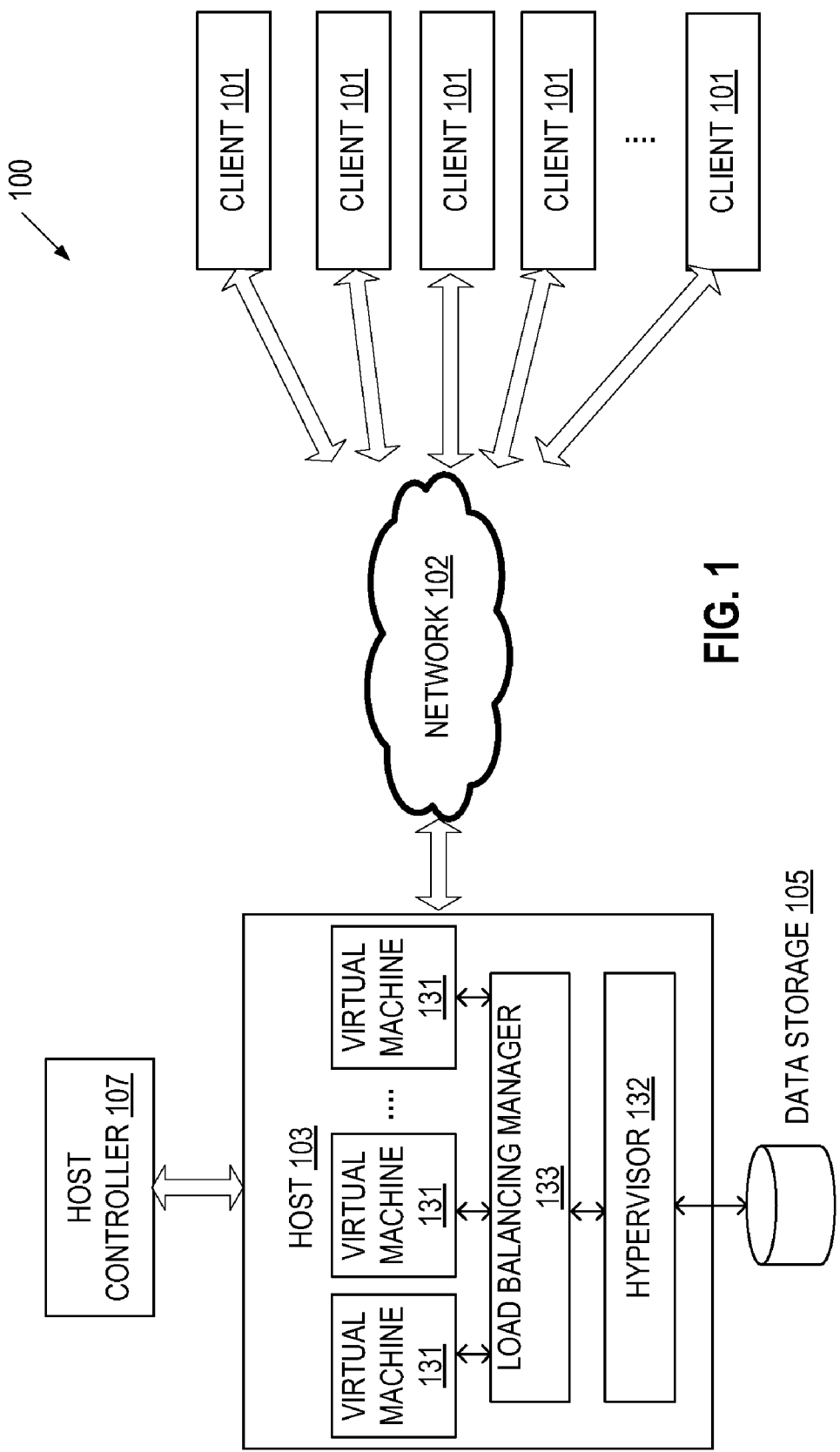
FIG. 1 illustrates an exemplary network architecture in which embodiments of the present invention may operate.

Described herein is a method and system for dynamically balancing the load between a server and a client. In one embodiment, a client sends a request to a server to establish a connection. The request includes capacity information of the client, such as memory capacity, processing capacity, etc. Based on the capacity information, the server and the client negotiate the load that will be allocated between the server and the client. The connection is then established. During the operation, the server and the client can rebalance the load distribution to adjust for a changed environment.

In one embodiment, the server is part of a host that provides a virtual machine for the client. The virtual machine receives input from a client, executes client applications according to the input, and directs output to the client. Some of the clients have more memory and processing capacities than other clients. The more powerful clients (thick clients) have the capacity to execute some portions of the client applications without being overloaded. Thus, a thick client can off-load the server so that the server can accommodate more virtual machines. By distributing a portion of the server load to thick clients, the system capacity can be increased. Further, the existing resources in the system can be better utilized.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "negotiating", "balancing", "classifying", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 includes a host 103 coupled to one or more clients 101 over a network 102. The network 102 may be a private network (e.g., a local area network (LAN), wide area network (WAN), intranet, etc.) or a public network (e.g., the Internet). The host 103 is also coupled to a data storage 105. In addition, the host 103 may be coupled to a host controller 107 (via a network or directly). Alternatively, the host controller 107 may be part of the host 103.

In one embodiment, the clients 101 may include computing devices that have a wide range of capabilities. Some of the clients 101 may be thin clients, which serve as access terminals for users and depend primarily on the host 103 for processing activities. A thin client has limited processing and memory capacities. For example, a thin client may a laptop computer, cellular phone, personal digital assistant (PDA), a re-purposed desktop computer, etc. Some of the clients 101 may be thick (fat) clients, which have graphics processors, powerful CPUs and large memory. For example, a thick client may be a dual-core or multi-core computer, workstation, graphics workstation, etc. Some of the clients 101 may be configured, e.g., by a system administrator, to a capacity configuration setting that is different from their actual capacities. For example, a thick client may be configured to be used as a thin client. The client 101 may run client applications such as a Web browser and a graphic user interface (GUI). The client 101 may also run other client applications, which receive multimedia data streams or other data from the host 103 and re-direct the received data to a local display or other user interface.

According to one embodiment of the present invention, the load allocated to a client depends on the capacity of the client. If the client is a thin client, the host 103 will try to perform as much operations as possible for the client. The thin client will only handle those operations that do not overload the client. If the client is a thick client capable of accepting additional loads, some operations will be shifted from the host 103 to the thick client. The type of a client (thick vs. thin) can be determined based on pre-defined classification criteria that are stored on the host 103 or the host controller 107. Multiple levels of thickness and thinness can be defined.

In one embodiment, the host 103 includes a server or a cluster of servers to run one or more virtual machines 131. In the following description, the terms "host" and "server" are used interchangeably. Each virtual machine 131 runs a guest operating system (OS) that may be different from one virtual machine to another. The guest OS may include Microsoft Windows, Linux, Solaris, Mac OS, etc. The host 103 may include a hypervisor 132 that emulates the underlying hardware platform for the virtual machines 131. The hypervisor 132 may also be known as a virtual machine monitor (VMM), a kernel-based hypervisor or a host operating system.

Each virtual machine 131 can be accessed by one or more of the clients 101 over the network 102. Each virtual machine 131 executes operations for a client. The execution of the operations represents the load on the server. In one scenario, each virtual machine 131 provides a virtual desktop for the client 101 and executes some or all of the graphics operations relating to the virtual desktop. From the user's point of view, the virtual desktop functions as a physical desktop (e.g., a personal computer) and is indistinguishable from a physical desktop.

In one embodiment, the virtual machines 131 can be managed by the host controller 107. The host controller 107 may also add a virtual machine, delete a virtual machine, balance the load on the server cluster, provide directory service to the virtual machines 131, and perform other management functions.

According to one embodiment of the present invention, the host 103 includes a load balancing manager 113 that manages the distribution of load between the host 103 and the client 101. The load balancing manager 113 negotiates the load with the client 101 before and after a connection with the client is setup. The load balancing manager 113 will be described in greater detail with reference to FIGS. 2-4.

Figure 2:
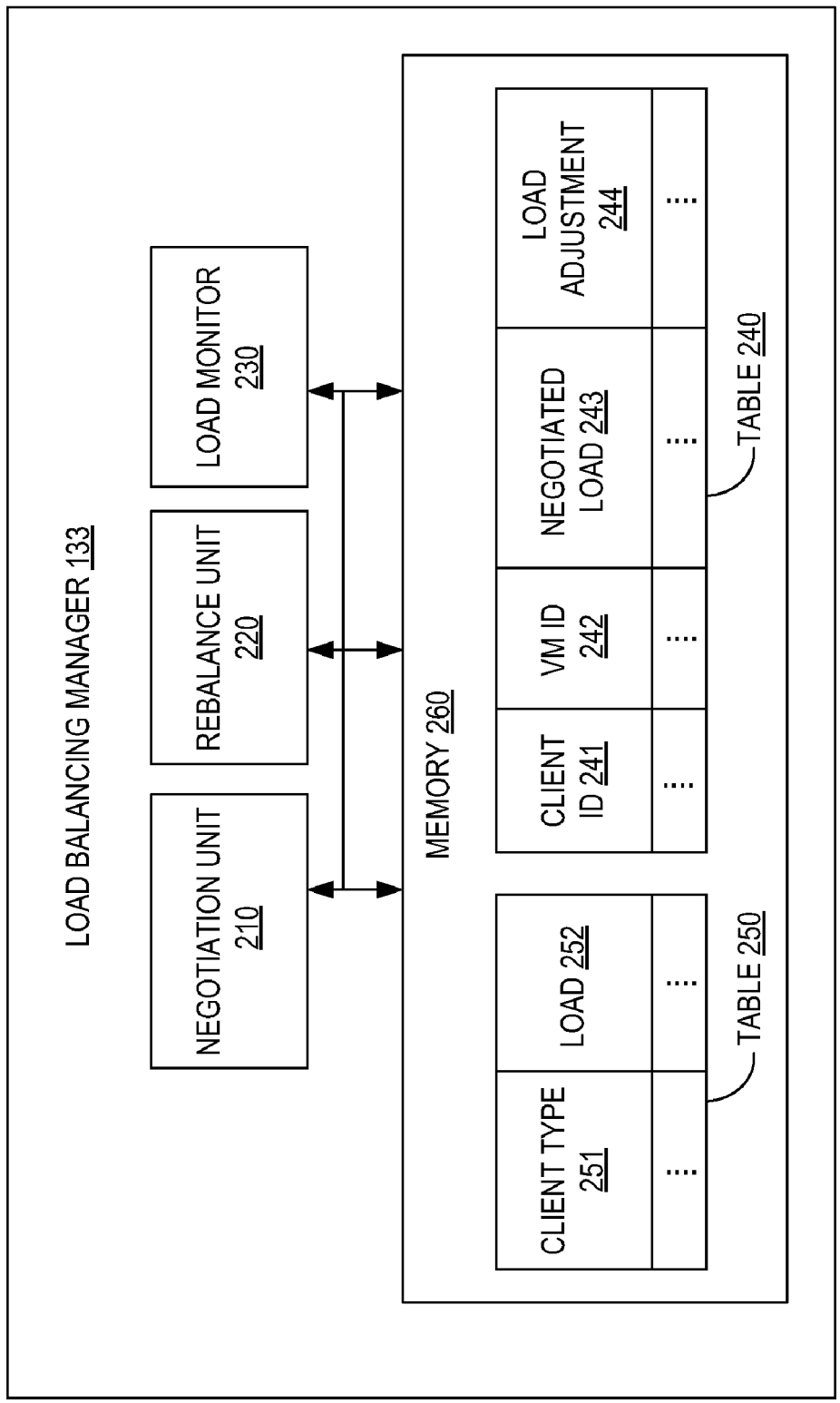
FIG. 2 illustrates an embodiment of a load balancing manager that operates on a host.

FIG. 2 is a block diagram that illustrates an embodiment of the load balancing manager 133. In this embodiment, the load balancing manager 133 includes a negotiation unit 210, a rebalance unit 220 and a load monitor 230. The negotiation unit 210 negotiates the load between the server (of the host 103) and the client 101 that requests the setup of a connection. The negotiation unit 210 receives the information about the capacity of the requesting client, such as CPU speed, memory size, graphics processing speed, whether a graphics card is present on the client, etc. The capacity may be the actual capacity or the configured capacity of the client. Based on the capacity information, the negotiation unit 210 determines the load to be allocated to the requesting client.

In one embodiment, the negotiation unit 210 may classify the requesting clients into two or more client types according to their capacities. The negotiation unit 210 can consult a data structure, such as a table 250 in a memory 260, which maps each client type 251 to the load 252 to be allocated to that client type. The client types can be determined by pre-defined criteria that classify the clients based on their memory and processing capacities. The load 252 may include a list of operations, such as compression/decompression, graphics stretching, etc., which will be performed by a requesting client of a corresponding client type. In alternative embodiments, the load 252 may include the operations that are allocated to the server instead of the operations that are allocated to the client.

After a client connection is set up, the negotiated load of the client is recorded in a data structure, such as a table 240 in the memory 260. In one embodiment, the table 240 keeps track of the load of a client. The table 240 includes a client ID 241, a virtual machine (VM) ID 242, a negotiated load 243 and a load adjustment 244. The client ID 241 may include an Internet Protocol (IP) address or other identifiers of the client. The client ID 241 may also include the type of the client, such as the client type 251 recorded in the table 250. The virtual machine ID 242 identifies the virtual machine on the host 103 that supports the client. The negotiated load 243 includes a list of operations that are allocated to the client side, and the load adjustment 244 includes a list of operations that are dynamically adjusted for the client after the connection with the client has been established. In alternative embodiments, the negotiated load 243 and the load adjustment 244 include the operations that are performed on the server side instead of the client side. In one embodiment, the negotiated load 243 and the load adjustment 244 can be combined to indicate the current load of the server or the client. The table 240 can include additional information related to the client and its load.

In one embodiment, the load balancing manager 133 also includes a rebalance unit 220 to adjust a negotiated load for a client after a connection with the client has been setup. The rebalance unit 220 determines whether an adjustment should be made, and an amount of the adjustment if the adjustment is to be made. The determination may be triggered by an increase/decrease of the server load, a request from a client to change the client load, a need to support more/fewer virtual machines on the server, a need to adjust the network traffic, etc. For example, if a client experiences an increase in the amount of graphics processing and the increase has significantly slowed down the client performance, the client may re-negotiate with the rebalance unit 220 to shift some load to the server. As another example, if the server load has significantly increased after a client connection is set up (e.g., more virtual machines have been added to the server), the rebalance unit 220 may redistribute some server load to the client to offload the host 103. The rebalance unit 220 can lookup the table 240 to determine the clients that can receive additional load. For example, a thick client can be asked to take on additional load to reduce the server load. The load adjustment 244 field of the table 240 records the change to the negotiated load after a connection to the client has been set up. The rebalance unit 220 allows the roles of the server and the client to be dynamically changed during operation.

One example of load balance between a server and a client is graphics stretching. In one scenario, graphics data (e.g., 100 pixels×100 pixels of an image, video, or animation) can be stretched to fit the size of a client display, such as a screen with a resolution of 1024×768 pixel array. Graphics stretching is CPU intensive. The server can send pre-stretched graphics to the client and have the client perform the stretching. Alternatively, the server can stretch the graphics for the client before the graphics data is sent to the client. The server and the client can negotiate who is to perform graphics stretching at the connection setup time, and can dynamically change the negotiated result during operation.

As another example, graphics compression can be performed by the server to reduce the amount of network traffic at the expense of increased server load. The client load is also increased as the client will have to perform graphics decompression to restore the original data. When the load is initially negotiated between a server and a client, the amount of compression may be set to a high level for a thick client and a low level for a thin client. However, when the server load increases, the server may reduce the amount of compression for the thick client to save CPU cycles. As the thick client has less decompression to perform, the thick client may accept additional load from the server (e.g., graphics stretching) to offload the server. Thus, the load between the server and the client is changed dynamically.

The load balancing manager further includes the load monitor 230. The load monitor 230 monitors the load of each server on the host 103. In one embodiment, the load monitor 230 sends an indication to the load balancing manager 133 when the load among the servers becomes unbalanced and needs re-distribution among the servers. The load monitor 230 also sends an indication to the load balancing manager 133 when the load of a server is over or under a threshold, and system performance or utilization can be improved by re-balancing the load between the server and its clients. The load balancing manager 133 re-balances the load according to the received indication. In one embodiment, when an indication of server-client load imbalance is received, the load balancing manager 133 signals the rebalance unit 220 to start redistributing the server load to its clients. When the server is overloaded, the load balancing manager 133 may signal the negotiation unit 210 to negotiate a lighter server load for new connection requests, or to decline any new connection requests until the server load is reduced.

Figure 3:
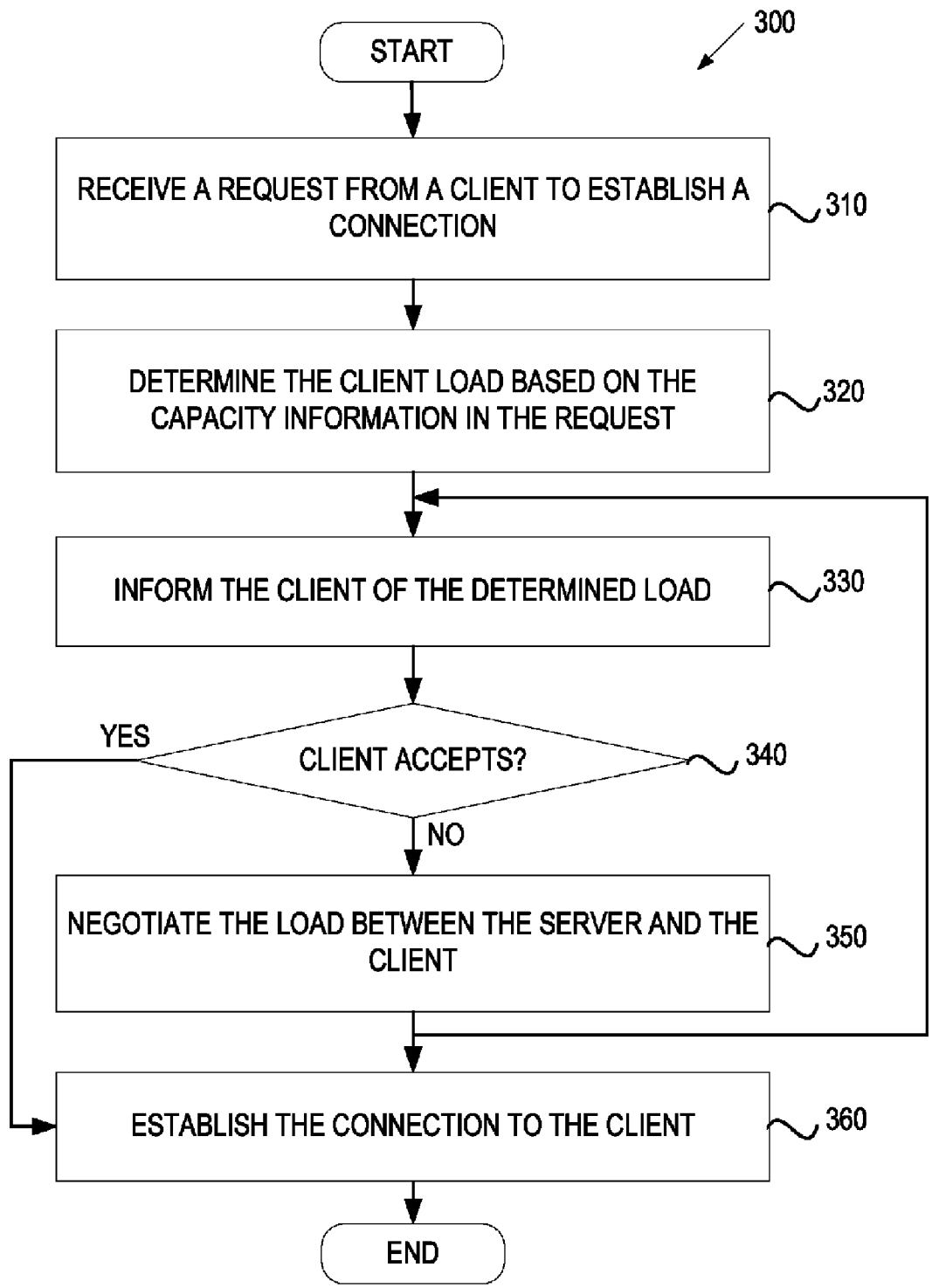
FIG. 3 is a flow diagram illustrating a method for negotiating the load between a server and a client during connection setup time in accordance with one embodiment of the present invention.

FIG. 3 is a flow diagram illustrating one embodiment of a method 300 for negotiating the load between a server and a client at a connection setup time. The method 300 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 300 is performed by the load balancing manager 133 (FIGS. 1 and 2).

Referring to FIG. 3, in one embodiment, the method 300 begins with the load balancing manager 133 receiving a request from a client to establish a connection (block 310). The request includes capacity information of the requesting client, such as CPU speed, memory size, graphics processing speed, and whether a graphics card is present on the requesting client, etc. The capacity may be the actual capacity of the requesting client or a configured capacity that overwrites the actual capacity. Based on the capacity information, the load balancing manager 133 determines the load to be allocated to the requesting client (block 320). This initial determination may be based on pre-defined classification criteria that map a client type to a corresponding load, such as the mapping provided by the table 250 of FIG. 3. The load balancing manager 133 may also take into account the current server load in the determination. The load balancing manager 133 then informs the client of the determination (block 330).

After the requesting client receives the load determined by the server, the client can accept the load (block 340), and a connection can be setup between the server and the client (block 360). If the client does not accept the load (block 340), the load balancing manager 133 can re-balance the load between the server and the client (block 350) and inform the client of the re-balanced load (block 340) until the client accepts the load. A connection with the client is established once the client agrees with the load distribution. In one embodiment, if the client keeps rejecting the offered load, the server can decline the connection request.

Figure 4:
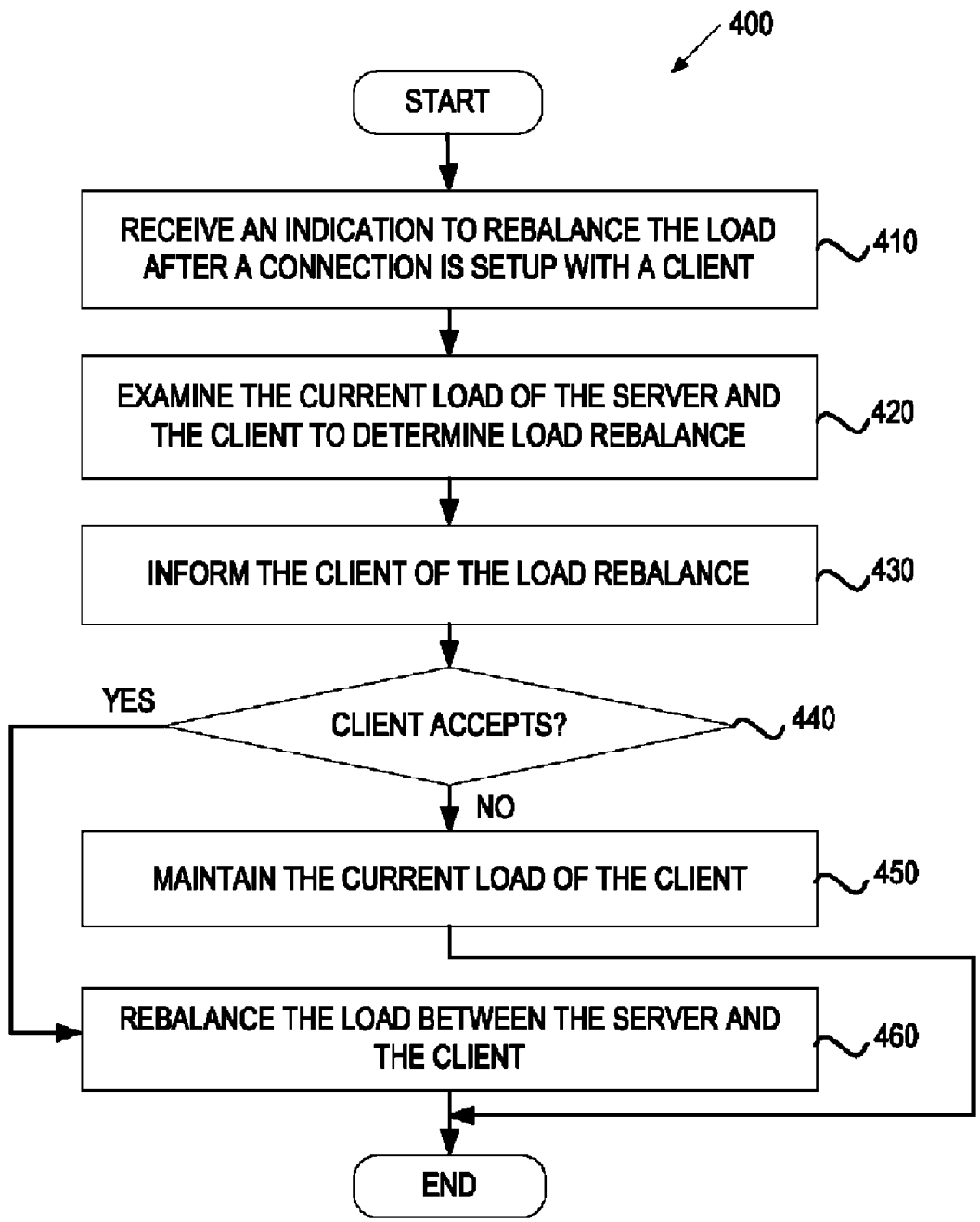
FIG. 4 is a flow diagram illustrating a method for dynamically rebalancing the load between a server and a client in accordance with one embodiment of the present invention.

FIG. 4 is a flow diagram illustrating one embodiment of a method 400 for dynamically adjusting the load between a server and a client after a connection with the client is set up. The method 400 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 400 is performed by the load balancing manager 133 (FIGS. 1 and 2).

Referring to FIG. 4, in one embodiment, the method 400 begins with the load balancing manager 133 receiving an indication to rebalance the load between a server and a client (block 410). The indication may be received when the server, the client or the network coupling the server to the client is overloaded or under-utilized. The indication may be sent from the client as a request for load rebalance, from the server (e.g., the load monitor 230 of FIG. 3) when the server load exceeds or falls below a threshold, or from a system administrator who determines that there is a need to rebalance the load (e.g., when the server has to accommodate more or fewer virtual machines 131, or when the network is congested or under-utilized). In an embodiment where the host 103 includes multiple servers, the load balancing manager 133 may rebalance the load among the servers before invoking the load rebalance between a server and its client.

After receiving the indication, the load balancing manager 133 examines the current load of the server and the client to determine which operations to be shifted from one side to the other (block 420). The load balancing manager 133 then informs the client of the determination (block 430). The client can accept the rebalanced load (block 440), and the load between the server and the client is adjusted according to the determination (block 460). If the client does not accept the rebalanced load (block 440), the load balancing manager 133 can maintain the current load of the client (block 450). In some embodiments, the load balancing manager 133 may negotiate the amount of load that will be shifted to the client until the client accepts the load.

Figure 5:
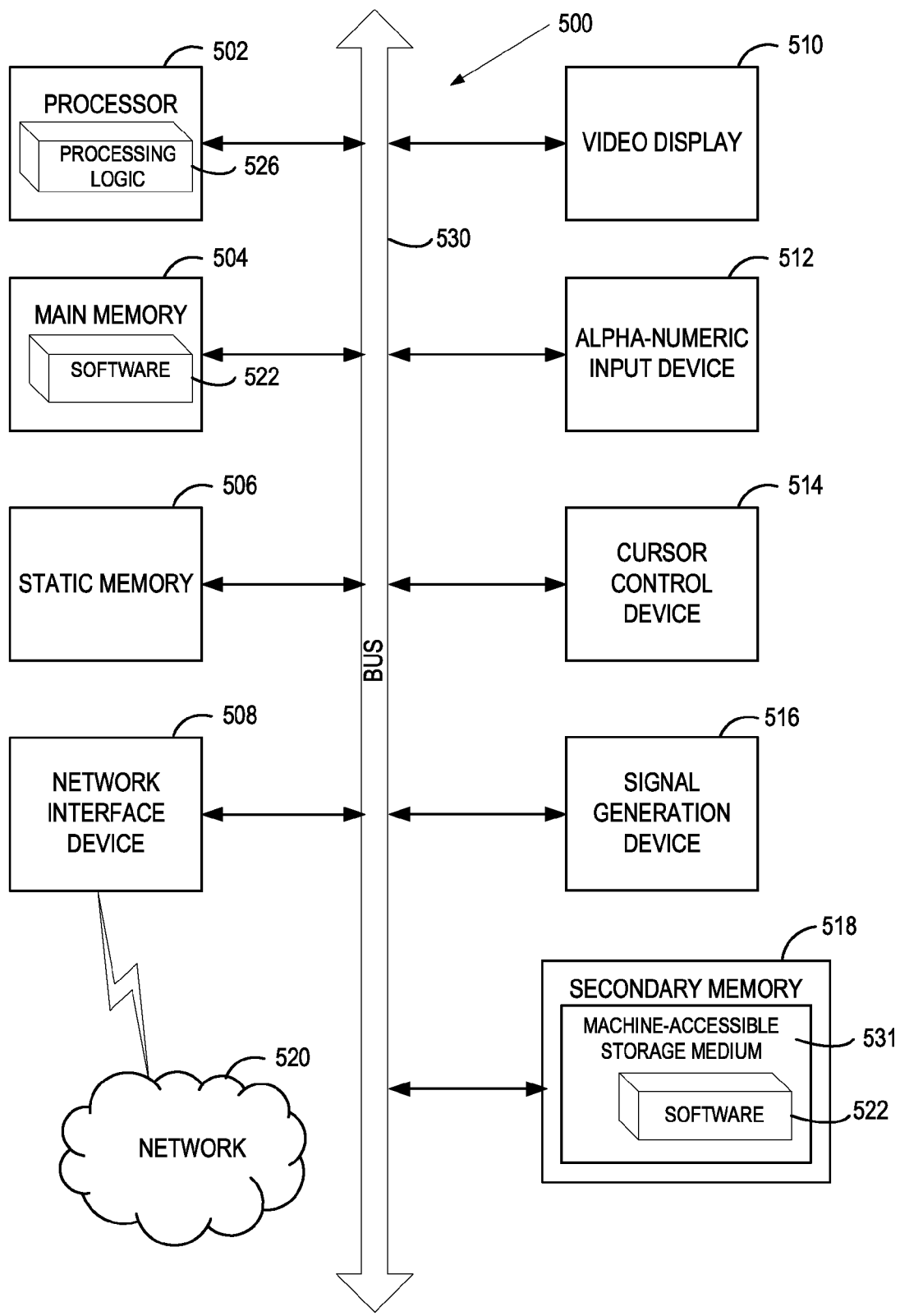
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the load balancing manager 133 of FIGS. 1 and 2. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method comprising:
   receiving, at a server that hosts virtual machines for a plurality of clients, a request from a requesting client to establish a connection between the requesting client and the server, wherein at least one of the virtual machines is associated with the requesting client to perform operations for the requesting client;
   negotiating a load of the requesting client based on capacity information of the requesting client in the request, the load of the requesting client comprising operations to be performed by the requesting client;

establishing the connection between the requesting client and the server; and upon detecting an event pertaining to a change in the virtual machines hosted by the server, determining whether to adjust a load of the server between the requesting client and the server, the load of the server comprising operations to be performed by the associated virtual machine for the requesting client.

2. The method of claim 1, wherein the capacity information includes memory capacity and processing capacity.

3. The method of claim 1, wherein the capacity information includes a configuration setting that overwrites an actual capacity of the requesting client.

4. The method of claim 1, further comprising:
dynamically balancing the load between the server and the requesting client after the connection is established.

5. The method of claim 1, further comprising:
dynamically balancing the load between the server and the clients when there is a change to the load on the server, the clients, or a network coupling the server and the clients.

6. The method of claim 1, further comprising:
classifying the requesting client into one of a plurality of client types according to the capacity information and pre-defined classification criteria; and
determining the load of the requesting client based on a result of classification.

7. The method of claim 1, further comprising:
monitoring the load of the server to determine whether to rebalance the load between the server and the requesting client.

8. A system comprising:
a server to host virtual machines for clients, the server comprising:
a load balancing manager to receive a request from a requesting client to establish a connection between the requesting client and the server, wherein at least one of the virtual machines is associated with the requesting client to perform operations for the requesting client, to negotiate a load of the requesting client based on capacity information of the requesting client in the request, the load of the requesting client comprising operations to be performed by the requesting client, to establish the connection between the requesting client and the server, and to determine whether to adjust a load of the server between the requesting client and the server upon detecting an event pertaining to a change in the virtual machines hosted by the server, the load of the server comprising operations to be performed by the associated virtual machine for the requesting client; and
data storage coupled to the server, the data storage to store information of the load negotiated by the server.

9. The system of claim 8, wherein the capacity information includes memory capacity and processing capacity.

10. The system of claim 8, wherein the capacity information includes a configuration setting that overwrites an actual capacity of the requesting client.

11. The system of claim 8, wherein the server further comprises:
a rebalance unity to dynamically balance the load between the server and the requesting client after the connection is established.

12. The system of claim 8, wherein the host further comprises:
a load monitor to monitor the load of the server to determine whether to rebalance the load between the server and the requesting client.

13. The system of claim 8, wherein the system further comprises:
a memory to store a data structure that classifies the requesting client into one of a plurality of client types according to the capacity information and pre-defined classification criteria.

14. A non-transitory computer readable storage medium including instructions that, when executed by a processing system, cause the processing system to perform a method comprising:
receiving, at a server that hosts virtual machines for a plurality of clients, a request from a requesting client to establish a connection between the requesting client and the server, at least one of the virtual machines being associated with the requesting client to perform operations for the requesting client;
negotiating a load of the requesting client based on capacity information of the requesting client in the request, the load of the requesting client comprising operations to be performed by the requesting client;
establishing the connection between the requesting client and the server; and
upon detecting an event pertaining to a change in the virtual machines hosted by the server, determining whether to adjust a load of the server between the requesting client and the server, the load of the server comprising operations to be performed by the associated virtual machine for the requesting client.

15. The computer readable storage medium of claim 14, wherein the capacity information includes memory capacity and processing capacity.

16. The computer readable storage medium of claim 14, wherein the capacity information includes a configuration setting that overwrites an actual capacity of the requesting client.

17. The computer readable storage medium of claim 14, wherein the method further comprises:
dynamically balancing the load between the server and the requesting client after the connection is established.

18. The computer readable storage medium of claim 14, wherein the method further comprises:
dynamically balancing the load between the server and the clients when there is a change to the load on the server, the clients, or a network coupling the server and the clients.

19. The computer readable storage medium of claim 14, wherein the method further comprises:
classifying the requesting client into one of a plurality of client types according to the capacity information and pre-defined classification criteria; and
determining the load of the requesting client based on a result of classification.

20. The computer readable storage medium of claim 14, wherein the method further comprises:
monitoring the load of the server to determine whether to rebalance the load between the server and the requesting client.

* * * * *